(12) United States Patent
Putman

(10) Patent No.: US 9,043,361 B2
(45) Date of Patent: *May 26, 2015

(54) MIGRATION OF DATA FROM A LEGACY SYSTEM

(71) Applicant: International Business Machines Corporation, Armonk, NY (US)

(72) Inventor: Jeffrey R. Putman, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,835

(22) Filed: Nov. 20, 2014

(65) Prior Publication Data

US 2015/0081634 A1 Mar. 19, 2015

Related U.S. Application Data

(63) Continuation of application No. 14/187,774, filed on Feb. 24, 2014, now Pat. No. 8,935,289, which is a continuation of application No. 13/749,890, filed on Jan. 25, 2013, now Pat. No. 8,745,089, which is a continuation of application No. 11/345,256, filed on Jan. 31, 2006, now Pat. No. 8,375,063.

(51) Int. Cl.
*G06F 17/30* (2006.01)

(52) U.S. Cl.
CPC ........ *G06F 17/303* (2013.01); *G06F 17/30339* (2013.01)

(58) Field of Classification Search
USPC ................................................. 707/790, 803
See application file for complete search history.

(56) References Cited

U.S. PATENT DOCUMENTS

| 5,787,433 | A | 7/1998 | Plotkin et al. | |
|---|---|---|---|---|
| 6,647,396 | B2 * | 11/2003 | Parnell et al. | 707/695 |
| 6,651,066 | B2 * | 11/2003 | Baxter et al. | 707/741 |
| 6,826,568 | B2 * | 11/2004 | Bernstein et al. | 707/749 |
| 6,920,447 | B2 * | 7/2005 | Pudipeddi et al. | 707/683 |
| 8,745,089 | B2 | 6/2014 | Putman | |
| 8,935,289 | B2 | 1/2015 | Putman | |
| 2005/0050068 | A1 * | 3/2005 | Vaschillo et al. | 707/100 |

(Continued)

OTHER PUBLICATIONS

Office Action (Mail Date Feb. 6, 2008) for U.S. Appl. No. 11/345,256, filed Jan. 31, 2006.

(Continued)

*Primary Examiner* — Kim Nguyen
(74) *Attorney, Agent, or Firm* — Schmeiser, Olsen & Watts LLP; Matthew Chung

(57) ABSTRACT

A method and system for translating data to be migrated from an older legacy database to a newer recipient database. Legacy data elements in the older legacy database are translated to correspond the one or more recipient data elements in the newer recipient database by utilizing a translation table in the older legacy database. The translation table defines recipient data elements in the newer recipient database based upon metadata of the older legacy database. The metadata of the older legacy database describes legacy data fields in the older legacy database. The older legacy database utilizes a first operating system. The newer recipient database utilizes a second operating system that differs from the first operating system. The legacy data elements translated in the older legacy database are used to migrate the legacy data elements translated from the older legacy database to the newer recipient database.

20 Claims, 6 Drawing Sheets

(56) References Cited

U.S. PATENT DOCUMENTS

| | | | |
|---|---|---|---|
| 2005/0050076 A1 | 3/2005 | Tong et al. | |
| 2005/0198085 A1* | 9/2005 | Blakey et al. | 707/204 |
| 2006/0173865 A1* | 8/2006 | Fong | 707/100 |
| 2007/0179983 A1 | 8/2007 | Putman | |
| 2007/0208723 A1* | 9/2007 | Peterson et al. | 707/4 |
| 2014/0172789 A1 | 6/2014 | Putman | |

OTHER PUBLICATIONS

Amendment filed May 27, 2008 for U.S. Appl. No. 11/345,256, filed Jan. 31, 2006.

Final Office Action (Mail Date Sep. 2, 2008) for U.S. Appl. No. 11/345,256, filed Jan. 31, 2006.

Notice of Appeal filed Dec. 2, 2008 for U.S. Appl. No. 11/345,256, filed Jan. 31, 2006.

Appeal Brief filed Feb. 2, 2009 for U.S. Appl. No. 11/345,256, filed Jan. 31, 2006.

Examiner's Answer to Appeal Brief (Mail Date May 28, 2009) for U.S. Appl. No. 11/345,256, filed Jan. 31, 2006.

Reply Brief filed Jul. 28, 2009 for U.S. Appl. No. 11/345,256, filed Jan. 31, 2006.

Notice of Allowance (Mail Date Oct. 10, 2012) for U.S. Appl. No. 11/345,256, filed Jan. 31, 2006.

Martin, J.; Data Warehouse Process; Ganthead Process Library; Retrieved from Internet:< URL: http://www.ganthead.com/pdf/ganthead_process_library.pdf>; 24 pages.

Office Action (Mail Date Sep. 18, 2013) for U.S. Appl. No. 13/749,890, filed Jan. 25, 2013.

Amendment filed Dec. 16, 2013 for U.S. Appl. No. 13/749,890, filed Jan. 25, 2013.

Exmaminer's Amendment Communication (Mail Date Jan. 10, 2014) for U.S. Appl. No. 13/749,890, Filed Jan. 25, 2013.

Notice of Allowance (Mail Date Jan. 17, 2014) for U.S. Appl. No. 13/749,890, filed Jan. 25, 2013.

Notice of Allowance (Mail Date Sep. 9, 2014) for U.S. Appl. No. 14/187,774, filed Feb. 24, 2014.

Office Action (Mail Date May 14, 2014) for U.S. Appl. No. 14/187,774, filed Feb. 24, 2014.

Amendment (filed Aug. 13, 2014) for U.S. Appl. No. 14/187,774, filed Feb. 24, 2014.

* cited by examiner

MIGRATION OF DATA FROM A LEGACY SYSTEM

This application is a continuation application claiming priority to Ser. No. 14/187,774, filed Feb. 24, 2014, which is a continuation of Ser. No. 13/749,890, filed Jan. 25, 2013, U.S. Pat. No. 8,745,089, issued Jun. 3, 2014, which is a continuation of Ser. No. 11/345,256, filed Jan. 31, 2006, U.S. Pat. No. 8,375,063, issued Feb. 12, 2013.

FIELD OF THE INVENTION

The present invention relates to a method for migrating data from legacy systems. More particularly, the present invention relates to a method for migrating data from a legacy database to a recipient database, including automating the building of a translation table to translate contents of the legacy database into their corresponding values in the recipient database.

BACKGROUND OF THE INVENTION

Databases are used widely in today's business environment to store a variety of data. Often data contained within an older database system is sought to be transferred to a newer database system using some sort of a database management system. However, given that an older database system may utilize a different database structure or schema than a newer database system, when transferring data from an older system to a newer system, database administrators and programmers often need to manually handle many of the tasks associated with transferring data into a newer database system, despite the use of a database management system. As such, it has become imperative that organizations and/or businesses examine the efficiency and effectiveness of transferring data from an older database system to a newer database system in terms of resources consumed, such as, storage and/or memory required as well as time spent by personnel within these organizations and/or businesses when transferring the data contained in these databases to another database as well as costs related to transferring data from such databases. Accordingly, there exists a need in the art to overcome the deficiencies and limitations described herein above.

SUMMARY OF THE INVENTION

In one aspect of the invention, there is provided a method for translating data to be migrated from a legacy database to a recipient database. The method comprises providing a legacy database having metadata describing one or more legacy data fields in the legacy database and creating a legacy value table in the legacy database that corresponds to a recipient value table in the recipient database. Further, the method comprises updating a translation table in the legacy database that defines one or more recipient data elements in the recipient database based upon the metadata of the legacy database, and translating legacy data elements in the legacy database to correspond to the one or more recipient data elements in the recipient database by utilizing the translation table. Further, the method comprises mapping the one or more legacy data fields in the legacy database to one or more recipient intermediary tables in the recipient database. Additionally, the method comprises populating a legacy interface table created in the legacy database with the legacy data elements that are translated and any remaining legacy data elements that are not translated and remotely extracting the data from the legacy interface table to the one or more recipient intermediary tables in the recipient database. Preferably, the providing step comprises providing a control table in the legacy database that has data descriptions for one or more recipient intermediary tables in the recipient database, updating the control table, and creating an empty legacy interface table in the legacy database by utilizing the control table that is updated. Preferably, the creating step comprises the creating a legacy value table step comprises updating the recipient value table in the recipient database, and populating the legacy value table in the legacy database by utilizing the recipient value table that is updated in the recipient database. Further, the updating a translation table step includes providing the translation table, providing a combination table in the legacy database that maps the one or more legacy data fields in the legacy database to corresponding recipient data fields in the legacy value table, and populating the translation table by utilizing the legacy value table and the combination table. Furthermore, the populating the translation table step using as a key field in the combination table, a recipient data field that corresponds to a legacy data field to read in the legacy value table a stored field value that corresponds to a stored field value in a stored field name in the legacy data field, creating a concatenated value by concatenating the stored field name in the legacy data field in the combination table with the stored field value read in the legacy value table, and utilizing the concatenated value to update the translation table with a stored display value in the legacy value table. Preferably, the metadata of the legacy database comprise a field name and a field value, and, preferably, the legacy data elements in the legacy database comprise the field value, and, preferably, the one or more recipient data elements in the recipient database comprise a display value. More preferably, the recipient database is a Siebel database.

In another aspect of the invention, there is provided a method for migrating data from a legacy database to a recipient database. The method comprises providing a legacy database having metadata describing one or more legacy data fields in the legacy database and creating a legacy value table in the legacy database that corresponds to a recipient value table in the recipient database. Further, the method comprises updating a translation table in the legacy database that defines one or more recipient data elements in the recipient database based upon the metadata of the legacy database, and translating legacy data elements in the legacy database to correspond to the one or more recipient data elements in the recipient database by utilizing the translation table. Additionally, the method comprises populating a legacy interface table created in the legacy database with the legacy data elements that are translated and any remaining legacy data elements that are not translated and remotely extracting the data from the legacy interface table in the legacy database to the one or more recipient intermediary tables in the recipient database. Preferably, the providing step comprises providing a control table in the legacy database that has data descriptions for the one or more recipient intermediary tables in the recipient database, updating the control table, and creating an empty legacy interface table in the legacy database by utilizing the control table that is updated. Preferably, the creating a legacy value table step comprises updating the recipient value table in the recipient database, and populating the legacy value table in the legacy database by utilizing the recipient value table that is updated in the recipient database. In a preferred embodiment, the updating a translation table step comprises providing the translation table, providing a combination table in the legacy database that maps the one or more legacy data fields in the legacy database to corresponding recipient data fields in the legacy value table, and populating the translation table by utilizing the legacy value table and the combination table. Preferably, the populating the translation table step comprises using as a key field in the combination table, a recipient data field that corresponds to a legacy data field to read in the legacy value table a stored field value that corresponds to a stored field value in a stored field name in the legacy data field, creating a concatenated value by concatenating the stored field name in the legacy data field in the combination table with the stored field value read in the legacy value table, and utilizing the concatenated value to update the translation table with a stored display value in the legacy value table. Preferably, the metadata of the legacy database comprise a field name and a field value, and, preferably, the legacy data elements in the legacy database comprise the field value, and, preferably, the one or more recipient data elements in the recipient database comprise a display value. More preferably, the recipient database is a Siebel database. In yet another aspect of the invention, there is provided a process for deploying computing infrastructure comprising integrating computer-readable code into a computing system, wherein the code in combination with the computing system is capable of performing a process of migrating data from a legacy database to a recipient database. The process of migrating data comprises providing a legacy database having metadata describing one or more data fields in the legacy database and mapping the one or more legacy data fields in the legacy database to one or more recipient intermediary tables in the recipient database. Further, the process comprises creating a legacy value table in the legacy database that corresponds to a recipient value table in the recipient database, updating a translation table in the legacy database that defines one or more recipient data elements in the recipient database based upon the metadata of the legacy database, and translating legacy data elements in the legacy database to correspond to the one or more recipient data elements in the recipient database by utilizing the translation table. Furthermore, the process comprises populating a legacy interface table created in the legacy database with the legacy data elements that are translated and any remaining legacy data elements that are not translated, and remotely extracting the data from the legacy interface table to the one or more recipient intermediary tables in the recipient database. Preferably, the creating a legacy value table step comprises updating the recipient value table in the recipient database, and populating the legacy value table in the legacy database by utilizing the updated recipient value table in the recipient database. Further, preferably, the updating a translation table step comprises providing the translation table, providing a combination table in the legacy database that maps the one or more legacy data fields in the legacy database to corresponding recipient data fields in the legacy value table, and populating the translation table by utilizing the legacy value table and the combination table. Additionally, the populating the translation table step comprises using as a key field in the combination table, a recipient data field that corresponds to a legacy data field to read in the legacy value table a stored field value that corresponds to a stored field value in a stored field name in the legacy data field, creating a concatenated value by concatenating the stored field name in the legacy data field in the combination table with the stored field value read in the legacy value table, and utilizing the concatenated value to update the translation table with a stored display value in the legacy value table. Preferably, the populating a legacy interface table step comprises providing a control table in the legacy database that has data descriptions for the one or more recipient intermediary tables in the recipient database, updating the control table, creating the empty legacy interface table in the legacy database by utilizing the updated control table, and populating the legacy interface table by utilizing the populated translation table. In a preferred embodiment, the metadata of the legacy database comprise a field name and a field value, and, preferably, the legacy data elements in the legacy database comprise the field value, and, preferably, the one or more recipient data elements in the recipient database comprise a display value. Further, preferably, the recipient database is a Siebel database.

In yet another aspect of the invention, there is provided a computer program product for migrating data from a legacy database to a recipient database. The computer program product comprises a computer readable medium, first program instructions to build a legacy interface table in the legacy database using an updated control table provided in the legacy database, second program instructions to build a legacy value table in the legacy database corresponding to an updated recipient value table in the recipient database, third program instructions to update a translation table provided in the legacy database, the translation table being configured to translate legacy data elements in the legacy database to correspond to recipient data elements in the recipient database, fourth program instructions to populate the legacy interface table in the legacy database for migrating the data from the legacy interface table to the recipient database. Further, the computer program product comprises fifth program instructions to extract the data from the legacy interface table to the recipient database. Preferably, the first, second, third, fourth and fifth program instructions are stored on the medium. In a preferred embodiment, the third program instructions comprise instructions to update a combination table provided in the legacy database that maps the one or more legacy data fields in the legacy database to corresponding recipient data fields in the legacy value table, and to update the translation table by utilizing the legacy value table and the updated combination table. Further, preferably, the third program instructions comprise instructions to use as a key field in the combination table, a recipient data field that corresponds to a legacy data field to read in the legacy value table a stored field value that corresponds to a stored field value in a stored field name in the legacy data field, to create a concatenated value by concatenating the stored field name in the legacy data field in the combination table with the stored field value read in the legacy value table, and to utilize the concatenated value to update the translation table with a stored display value in the legacy value table. In a preferred embodiment, the recipient database is a Siebel database.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
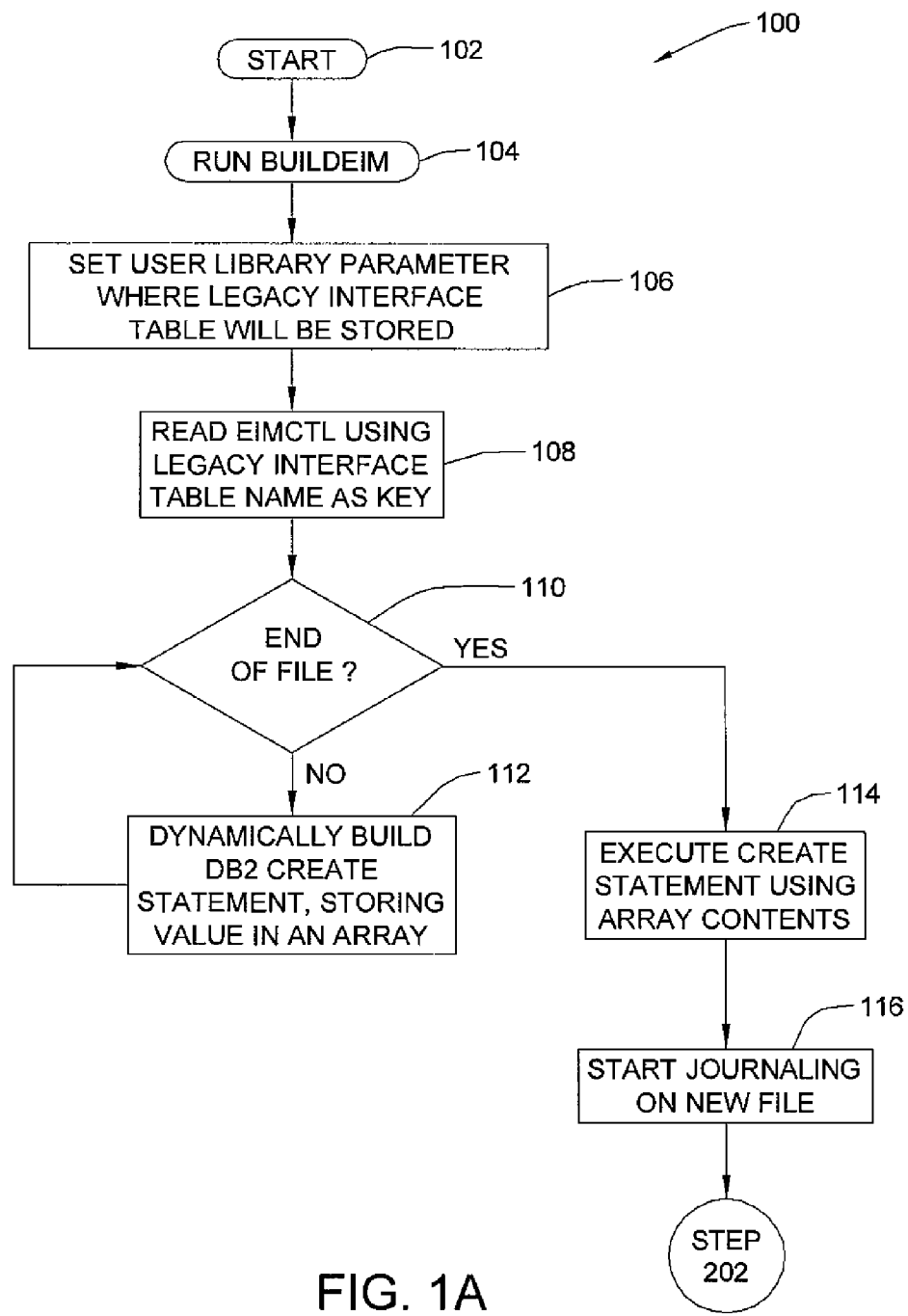
FIGS. 1A-1B are illustrations of a flowchart depicting a method for building a legacy interface table in the legacy database, in accordance with an embodiment of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a method for translating data to be migrated from a legacy database to a recipient database. In yet another embodiment, the invention provides a business method that performs the process steps of the invention on a subscription, advertising, and/or fee basis. That is, a service provider, such as a Solution Integrator, can offer to translate data from a legacy database to a recipient database. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties. The method comprises providing a legacy database having metadata describing one or more legacy data fields in the legacy database and creating a legacy value table in the legacy database that corresponds to a recipient value table in the recipient database. Further, the method comprises updating a translation table in the legacy database that defines one or more recipient data elements in the recipient database based upon the metadata of the legacy database, and translating legacy data elements in the legacy database to correspond to the one or more recipient data elements in the recipient database by utilizing the translation table. Further, the method comprises mapping the one or more legacy data fields in the legacy database to one or more recipient intermediary tables in the recipient database. Additionally, the method comprises populating a legacy interface table created in the legacy database with the legacy data fields that are translated and any remaining of the legacy data fields that are not translated and remotely extracting data from the legacy interface table to the one or more recipient intermediary tables in the recipient database. Preferably, the providing step comprises providing a control table in the legacy database that has data descriptions for one or more recipient intermediary tables in the recipient database, updating the control table, and creating an empty legacy interface table in the legacy database by utilizing the control table that is updated. Preferably, the creating step comprises the creating a legacy value table step comprises updating the recipient value table in the recipient database, and populating the legacy value table in the legacy database by utilizing the recipient value table that is updated in the recipient database. Further, the updating a translation table step providing the translation table, providing a combination table in the legacy database that maps the one or more legacy data fields in the legacy database to corresponding recipient data fields in the legacy value table, and populating the translation table by utilizing the legacy value table and the combination table. Furthermore, the populating the translation table step comprises using as a key field in the combination table, a recipient data field that corresponds to a legacy data field to read in the legacy value table a stored field value that corresponds to a stored field value in a stored field name in the legacy data field, creating a concatenated value by concatenating the stored field name in the legacy data field in the combination table with the stored field value read in the legacy value table, and utilizing the concatenated value to update the translation table with a stored display value in the legacy value table. Preferably, the metadata of the legacy database comprise a field name and a field value, and, preferably, the legacy data elements in the legacy database comprise the field value, and, preferably, the one or more recipient data elements in the recipient database comprise a display value. More preferably, the recipient database is a Siebel database.

As used herein, the term "legacy database" or "legacy application" or "legacy system" is used to refer to any database system that has been around for years and from which data needs to be transferred or migrated to another system. Further, the term "recipient database" refers to a recipient database, such as, a Customer Relationship Management (CRM) database, preferably, a Siebel CRM database manufactured by Siebel Systems, Inc. A Siebel® database is made up of intermediary tables (referred to herein as EIM tables or recipient intermediary tables) and base tables. Before any data from a legacy database can be migrated to a Siebel database, the data is first inserted into an intermediary table (EIM table or recipient intermediary table) in the Siebel database and then loaded into one or more base tables in the Siebel database. In particular, a Siebel database uses an application suite called Enterprise Integration Manager (EIM) for processing raw data from an intermediary table (EIM table) to one or more base tables in the Siebel database. Furthermore, as used herein, the term "migrating data" refers to the process of transferring data (field names and field values) from one or more existing legacy source tables in the legacy database to an intermediary (EIM) table in the Siebel database (the recipient database). Further, the term "data field" or "field" refers to a column in a table in either a legacy database or a recipient database. Moreover, the term "field name" refers to the name of the column in a table, whereas, the term "legacy data elements" refers to the field values associated with a data field in the legacy database, whereas, the term "recipient data elements" refers to the display values associated with a data field in the recipient database. As used herein the term "legacy source table" or "legacy source tables" refers to one or more tables in the legacy database from which data is being migrated to a recipient database. Further, the term "legacy data field" or "legacy data fields" refers to the data fields in the legacy database from which data is being migrated. Similarly, the term "recipient data field" refers to a data field in the recipient database or a data field that is copied into a table created in the legacy database for the process of translating data to be migrated. In addition, the term "recipient value table" refers to a table in the Siebel database that holds a list of values that the legacy data values has to be translated into in order to migrate data, whereas, the term "legacy value table" refers to the table created in the legacy database that is a copy of the recipient value table. Further, the term "control table" refers to a legacy value table that is updated with metadata that describes one or more data fields in the recipient intermediary tables in the recipient database, whereas, the term "legacy interface table" refers to a table created in the legacy database using data from the control table, such that, the legacy interface table in the legacy database has one or more data fields that correspond to data fields in an intermediary table (EIM table) in the recipient database. Furthermore, the term "combination table" refers to a legacy value table that has data fields corresponding to both the legacy database and the recipient database, whereas, the term "translation table" refers to the table that is created to translate only those legacy data field values or data elements that require translation in order to migrate the data to a recipient database.

In another embodiment, the present invention provides a method for migrating data from a legacy database to a recipient database. The method comprises providing a legacy database having metadata describing one or more legacy data fields in the legacy database and creating a legacy value table in the legacy database that corresponds to a recipient value table in the recipient database. Further, the method comprises updating a translation table in the legacy database that defines one or more recipient data elements in the recipient database based upon the metadata of the legacy database, and translating legacy data elements in the legacy database to correspond to the one or more recipient data elements in the recipient database by utilizing the translation table. Additionally, the method comprises populating a legacy interface table created in the legacy database with the legacy data fields that are translated and any remaining of the legacy data fields that are not translated and remotely extracting the data from the legacy interface table in the legacy database to the one or more recipient intermediary tables in the recipient database. Preferably, the providing step comprises providing a control table in the legacy database that has data descriptions for the one or more recipient intermediary tables in the recipient database, updating the control table, and creating an empty legacy interface table in the legacy database by utilizing the control table that is updated. Preferably, the creating a legacy value table step comprises updating the recipient value table in the recipient database, and populating the legacy value table in the legacy database by utilizing the recipient value table that is updated in the recipient database. In a preferred embodiment, the updating a translation table step comprises providing the translation table, providing a combination table in the legacy database that maps the one or more legacy data fields in the legacy database to corresponding recipient data fields in the legacy value table, and populating the translation table by utilizing the legacy value table and the combination table. Preferably, the populating the translation table step comprises using as a key field in the combination table, a recipient data field that corresponds to a legacy data field to read in the legacy value table a stored field value that corresponds to a stored field value in a stored field name in the legacy data field, creating a concatenated value by concatenating the stored field name in the legacy data field in the combination table with the stored field value read in the legacy value table, and utilizing the concatenated value to update the translation table with a stored display value in the legacy value table. Preferably, the metadata of the legacy database comprise a field name and a field value, and, preferably, the legacy data elements in the legacy database comprise the field value, and, preferably, the one or more recipient data elements in the recipient database comprise a display value. More preferably, the recipient database is a Siebel database.

Still yet, any of the components of the present invention could be deployed, managed, serviced, etc. by a service provider who offers to migrate data from a legacy database to a recipient database. Accordingly, in another embodiment, the invention provides a process for deploying computing infrastructure comprising integrating computer-readable code into a computing system, wherein the code in combination with the computing system is capable of performing a process of migrating data from a legacy database to a recipient database. The process of migrating data comprises providing a legacy database having metadata describing one or more data fields in the legacy database and mapping the one or more legacy data fields in the legacy database to one or more recipient intermediary tables in the recipient database. Further, the process comprises creating a legacy value table in the legacy database that corresponds to a recipient value table in the recipient database, updating a translation table in the legacy database that defines one or more recipient data elements in the recipient database based upon the metadata of the legacy database, and translating legacy data elements in the legacy database to correspond to the one or more recipient data elements in the recipient database by utilizing the translation table. Furthermore, the process comprises populating a legacy interface table created in the legacy database with the one or more legacy data fields that are in condition for migration to the recipient database, and remotely extracting data from the legacy interface table to the one or more recipient intermediary tables in the recipient database. Preferably, the creating a legacy value table step comprises updating the recipient value table in the recipient database, and populating the legacy value table in the legacy database by utilizing the updated recipient value table in the recipient database. Further, preferably, the updating a translation table step comprises providing the translation table, providing a combination table in the legacy database that maps the one or more legacy data fields in the legacy database to corresponding recipient data fields in the legacy value table, and populating the translation table by utilizing the legacy value table and the combination table. Additionally, the populating the translation table step comprises using as a key field in the combination table, a recipient data field that corresponds to a legacy data field to read in the legacy value table a stored field value that corresponds to a stored field value in a stored field name in the legacy data field, creating a concatenated value by concatenating the stored field name in the legacy data field in the combination table with the stored field value read in the legacy value table, and utilizing the concatenated value to update the translation table with a stored display value in the legacy value table. Preferably, the populating a legacy interface table step comprises providing a control table in the legacy database that has data descriptions for the one or more recipient intermediary tables in the recipient database, updating the control table, creating the empty legacy interface table in the legacy database by utilizing the updated control table, and populating the legacy interface table by utilizing the populated translation table. In a preferred embodiment, the metadata of the legacy database comprise a field name and a field value, and, preferably, the legacy data elements in the legacy database comprise the field value, and, preferably, the one or more recipient data elements in the recipient database comprise a display value. Further, preferably, the recipient database is a Siebel database. In a preferred embodiment, the Siebel database application is run on an AIX platform, which is a UNIX operating system, however, the Siebel database application can run on many other platforms. Moreover, in one embodiment, the legacy application is run on an AS/400 computer or server, which uses the OS/400 operating system.

In a preferred embodiment, the legacy database and the recipient database (Siebel database) are each made up of multiple tables. Preferably, each table has the same sort of a layout, namely, columns and rows and, further, each column has a stored column heading or name (field name) and contains a stored value (referred to as a field value in a legacy table and a display value in a recipient table), where the format of the stored data can differ from one database system to another. For instance, if a data field in the legacy source table is to be migrated to a data field in the recipient database and if the data field in the recipient database is bound to a data field in the recipient value table, then it becomes necessary to translate the stored field value in the data field of the legacy source table in order to migrate the data. The metadata in the legacy database describes the actual legacy data fields in the legacy value tables that will eventually get extracted from or migrated to the recipient database, namely, the Siebel database. Preferably, all the legacy data fields in the legacy database that is selected to be migrated is mapped to one or more recipient intermediary tables, such that the data from the legacy database first can be migrated to the one or more recipient intermediary tables and then from the intermediary tables to a recipient base table. Thus, preferably, one or more recipient intermediary tables in the recipient database are defined or set up based upon the metadata from the legacy database.

Figure 1B:
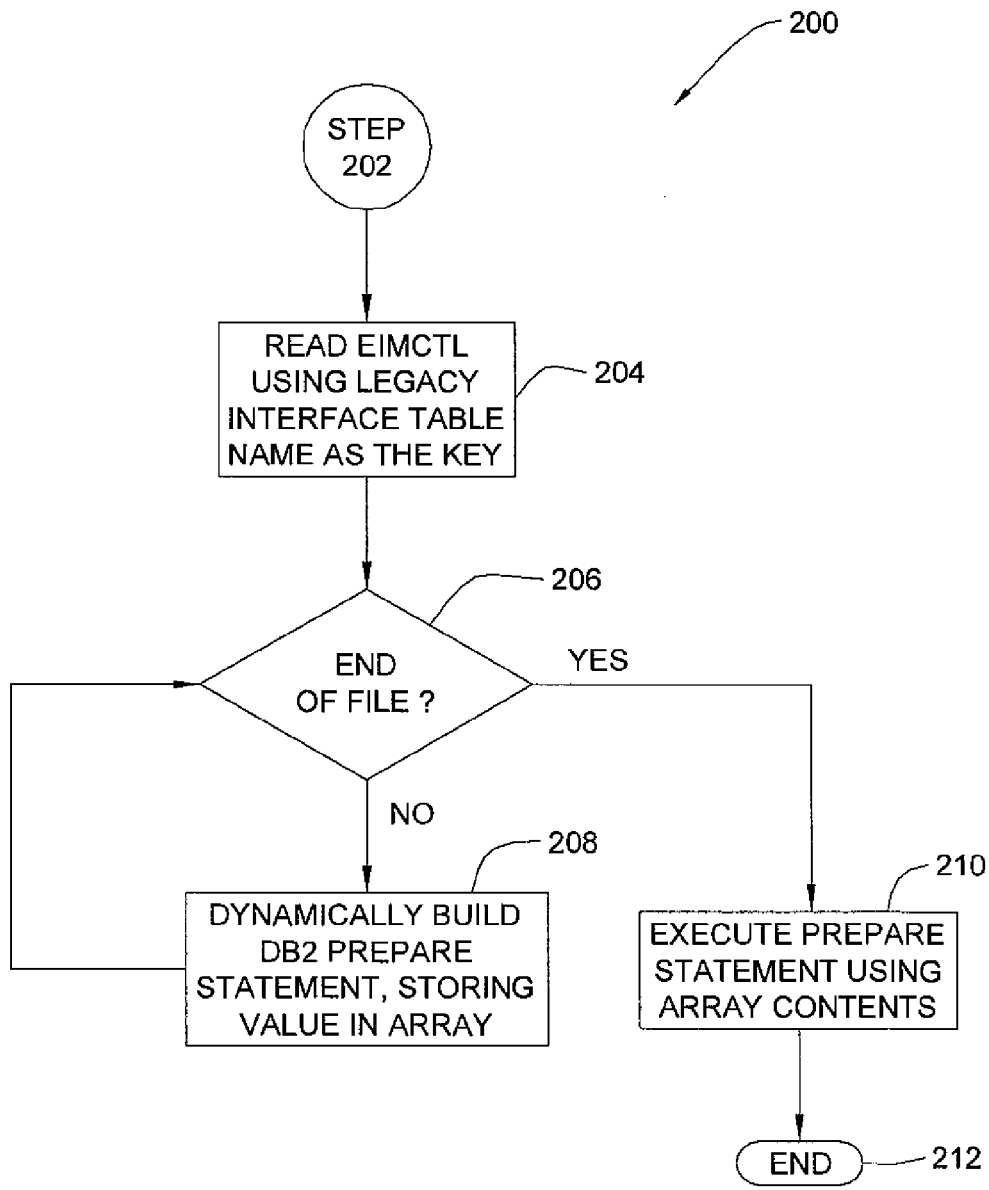

Reference is now made to FIGS. 1A and 1B, which together depict a method for building a legacy interface table in the legacy database. Turning to reference numeral 100 in FIG. 1A, the method for building a legacy interface table in the legacy database starts at step 102 with running the program or code called BUILDEIM in step 104. The User Library parameter, where the legacy interface table is to be stored is set up in step 106. In particular, the BUILDEIM program needs one parameter, namely, the User Library parameter, that is, the directory or location where the dynamically created legacy interface table will be created. Next, the BUILDEIM program in step 108 reads the EIMCTL table or file using the legacy interface table name as key. The EIMCTL table is a control table in the legacy database that contains a description of the data that is to be loaded in the legacy interface table and which is used to create any legacy interface table in the legacy database. In a preferred embodiment, the EIMCTL table is already created and already has (prior to running the BUILDEIM program) all the data descriptions of the data fields corresponding to a recipient intermediary table to which the legacy data is to be migrated, such that one can customize the EIMCTL table in order to select the data fields that one wants for the legacy interface table that is going to be created in the legacy database. Alternatively, the EIMCTL control table or file can be created, if necessary, from the legacy system source Data Description Specifications (DDS) by a person skilled in the art. For instance, if the EIMCTL table contains data descriptions for a plurality of data fields in a recipient intermediary table, such as, EIM FILE SEQUENCE, EIM FILE NAME, EIM FIELD NAME and EIM FIELD TYPE. One can select one or more of these fields that one wants for the legacy interface table that is going to be created and run the BUILDEIM program, so that when the BUILDEIM program is run, the legacy interface table will be built with the data fields that have been selected. However, if one decides that additional data fields, for instance, EIM FIELD LENGTH and EIM FIELD SCALE need to be added to the legacy interface table, then one would have to add the data fields EIM FIELD LENGTH and EIM FIELD SCALE to the EIMCTL table and rerun the BUILDEIM program to create a legacy interface table that includes these two additional data fields. The process of building a legacy interface table continues in step 110 of FIG. 1A with the BUILDEIM program making a determination as to whether or not it has reached the end of the EIMCTL table or file, that is, whether or not it has finished reading the EIMCTL table. If the BUILDEIM program has not completed reading the EIMCTL table, then the BUILDEIM program dynamically builds in step 112 a DB2 Create statement, storing the legacy interface table name and associated columns as a value stored in an array for later execution (as explained with respect to step 114). The program loops back to determine whether or not it has reached the end of the EIMCTL table or file. If the BUILDEIM program determines that it has reached the end of the file in step 110, then in step 114 the BUILDEIM program executes the DB2 Create statement using the contents or value stored in the array in step 112. Once the BUILDEIM program executes the Create statement to create a new or empty legacy interface table is created. The BUILDEIM starts journaling on the new legacy interface table file in step 116, before proceeding to step 202 in FIG. 1B, that is, before any data is inserted or populated into the new legacy interface table. In particular, the Start Journal (STRJRN) command is used to start journaling changes to a specific journal, that is, changes made to an object or list of objects. The journaling process keeps a journal of changes that occur in the legacy interface table or file. A journal is a journal object type that can contain one or many journaled files. These journals can be used to trace data changes, to restore data and, further, to maintain integrity of the data for security measures. In a preferred embodiment, the QSQJRN journal is the default journal where the journaling changes are to be located. Alternatively, one can create a journal or let the journaling process default to the QSQJRN journal.

Turning to FIG. 1B, the method of building a legacy interface table continues in step 202 of the flowchart 200 with the BUILDEIM program reading the EIMCTL table using the legacy interface table name as key in step 204. The BUILDEIM program makes a determination in step 206 as to whether or not it has reached the end of the EIMCTL table, that is, whether or not it has finished reading the EIMCTL table. If the BUILDEIM program has not completed reading the EIMCTL table in step 206, then the BUILDEIM program dynamically builds in step 208 a DB2 Prepare statement, storing the legacy interface table name as a value stored in an array for later execution in step 210 (explained herein below). The program loops back to step 206 to determine whether or not it has reached the end of the EIMCTL table or file. If the BUILDEIM program determines that it has reached the end of the file in step 206, then in step 210 the BUILDEIM program executes the DB2 Prepare statement using the contents or value stored in the array in step 208 before ending in step 212. Accordingly, the first step is to dynamically build and execute the Create statement, which upon execution creates the empty legacy interface table. As such, the data in the EIMCTL table is used to dynamically create the legacy interface table by supplying the BUILDEIM process with data needed to build an empty legacy interface table in the legacy database. However, in order to be able to load data into the legacy interface table, journaling needs to have started and the legacy interface table needs to be prepared for data load by building and executing the Prepare statement. Preferably, the DB2 Prepare statement is used to refer to the preparing of an SQL "Insert into" statement for execution at a later time in the process, which allows for the insertion of data dynamically into the legacy interface table that is created. Preferably, another custom program created by a developer skilled in the art would use the Prepare statement to execute an Insert statement to populate the empty legacy interface table with the appropriate data contained in one or more tables in the legacy database from which data is being migrated to the recipient database.

Once an empty legacy interface table has been created, in another embodiment, the invention provides an automated process for building a translation table that is used to transfer or migrate data from the legacy database to one or more EIM tables in the recipient database. Since some of the stored field values in one or more data fields in the legacy database to be migrated may correspond to one or more data fields in the recipient database that are bound to the recipient value table, the data contained in those one or more data fields cannot be transferred as is from the legacy database to the recipient database and, instead, a translation table needs to be created for translating the legacy data elements corresponding to those one or more legacy data fields that are going to be migrated. In order to build a translation table, a legacy value table is created in the legacy database, which holds data from a recipient value table in the recipient database, as discussed herein with respect to FIG. 2. Further, a combination table is provided in the legacy database for facilitating the process of translating data from a legacy database to a recipient database, as explained herein below with respect to FIG. 3. In particular, the legacy value table created in the legacy database is referred to as the S_LST1 table and the recipient value table in the recipient database is referred to as the S_LST_OF_VAL table. Further, the combination table provided in the legacy database is referred to as the EIMLOV table and the translation table created in the legacy database is referred to as the EIMXFER table. In particular, the translation table, EIMXFER, is created in the legacy database in order to translate the data in one or more of the columns in the legacy database to the values in the S_LST_OF_VAL table in the recipient database, which is the target table to which the legacy data to be migrated has to match. In other words, some of the data stored in the legacy database will have to be translated to correspond to the values in the S_LST_OF_VAL table in the Siebel database. Only the columns in the legacy database that are bound to values in the recipient value table will use this translation process. Some columns in the EIMXFER translation table will simply get the raw data as it resides in the legacy database. In a preferred embodiment, the S_LST_OF_VAL table contains the data fields S_LST_OF_VAL.TYPE, S_LST_OF_VAL.NAME and S_LST_OF_VAL.VAL (shown in FIG. 5), whereas, the S_LST1 table contains the data fields LOV TYPE, NAME and VAL (also shown in FIG. 5). The data field LOV TYPE in S_LST1 corresponds to the data field S_LST_OF_VAL.TYPE in the S_LST_OF_VAL table, whereas, the data field NAME in the S_LST1 table corresponds to the data field S_LST_OF_VAL.NAME in the S_LST_OF_VAL table, and the data field VAL in the S_LST1 table corresponds to the data field S_LST_OF_VAL.VAL in the S_LST_OF_VAL table.

Figure 5:
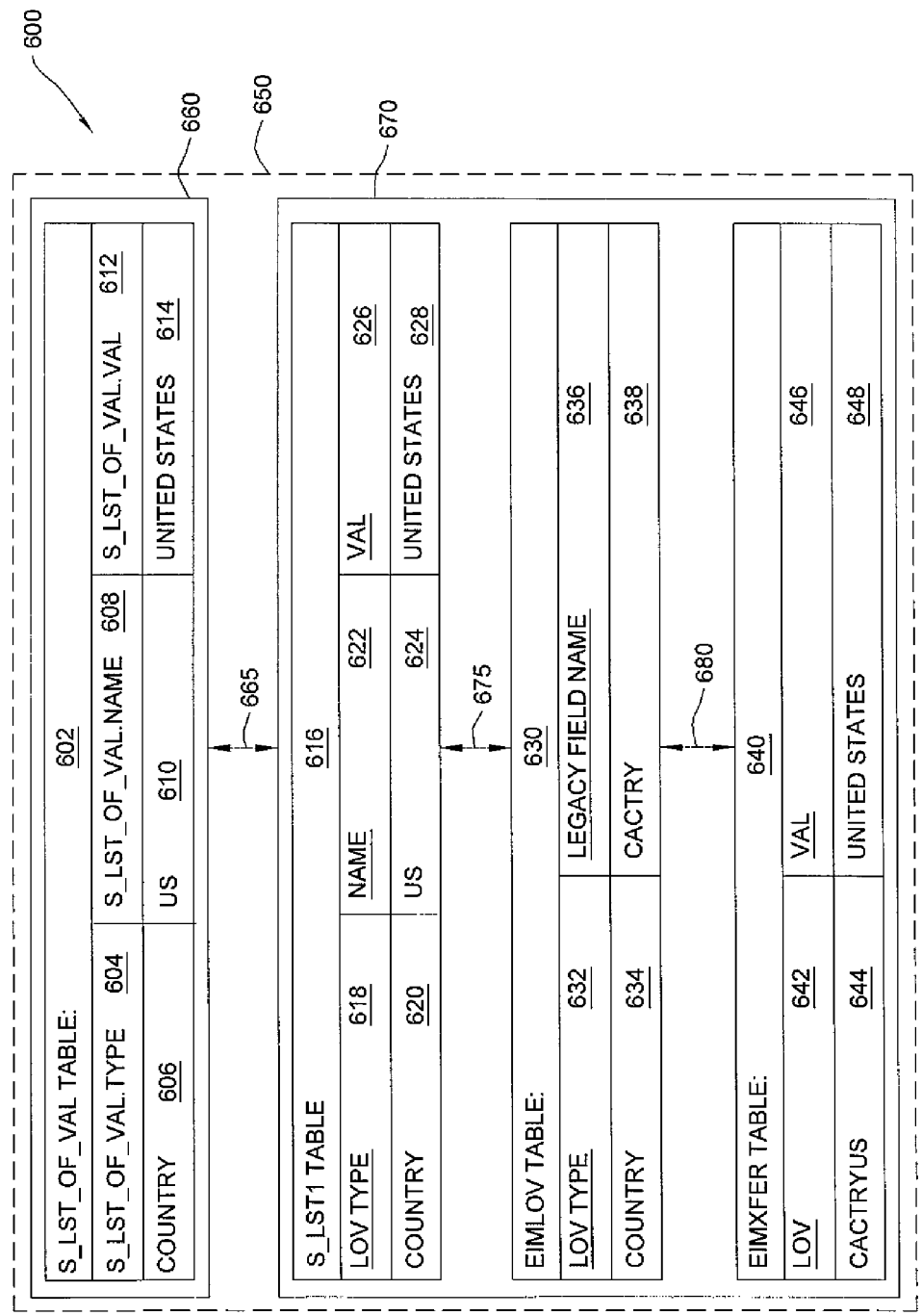
FIG. 5 depicts an example of translating data from a legacy database to a recipient database, in accordance with an embodiment of the invention.

Further, in a preferred embodiment, the combination table, EIMLOV, contains data fields (columns) from both the legacy database and the recipient database, which are used to help identify translations between the legacy codes, that is, the field values stored in a legacy value table and their corresponding codes or display values stored in the recipient database. In particular, the EIMLOV table contains data fields from both the recipient value table, S_LST_OF_VAL table, in the recipient database (which is copied into the S_LST1 table in the legacy database) and one or more legacy source tables in the legacy database from which data is being migrated, such that a data field in the recipient database is keyed to a data field in the legacy database. Further, the EIMLOV table maps the data elements (field values) contained in a table in the recipient database to data elements (field values) contained in the table in the legacy database from which data is to be migrated, as explained further herein below with respect to FIG. 3 and FIG. 5. For instance, as shown in FIG. 5, the EIMLOV table contains the data field LOV TYPE from the recipient value table called S_LST_OF_VAL table in the recipient database and the data field LEGACY FIELD NAME from a legacy source table in the legacy database from which data is to be migrated. Further, the EIMLOV table gets updated, so that the stored data from the data columns LOV TYPE and LEGACY FIELD NAME in the EIMLOV table can be used along with the S_LST1 table to build the translation table EIMXFER. In a preferred embodiment, the LEGACY FIELD NAME refers to an actual legacy field or column name in the legacy database. The LEGACY FIELD NAME contains a stored field value that needs to be translated to the corresponding display value stored in the recipient database. That display value can be found by using the LOV TYPE in the EIMLOV table and looking up the corresponding legacy stored field value in the S_LST1 table, which contains data from the S_LST_OF_VAL table in the recipient database. Accordingly, the LOV TYPE is the key field of data column that is used to retrieve the corresponding display value in the recipient database, using the S_LST1 table, as will be explained in further detail herein below with respect to FIGS. 3 and 5. In a preferred embodiment, the EIMLOV table is already created in the legacy database, however, if necessary, the EIMLOV table can be created using the legacy system source Data Description Specifications (DDS) by a person skilled in the art.

Figure 2:
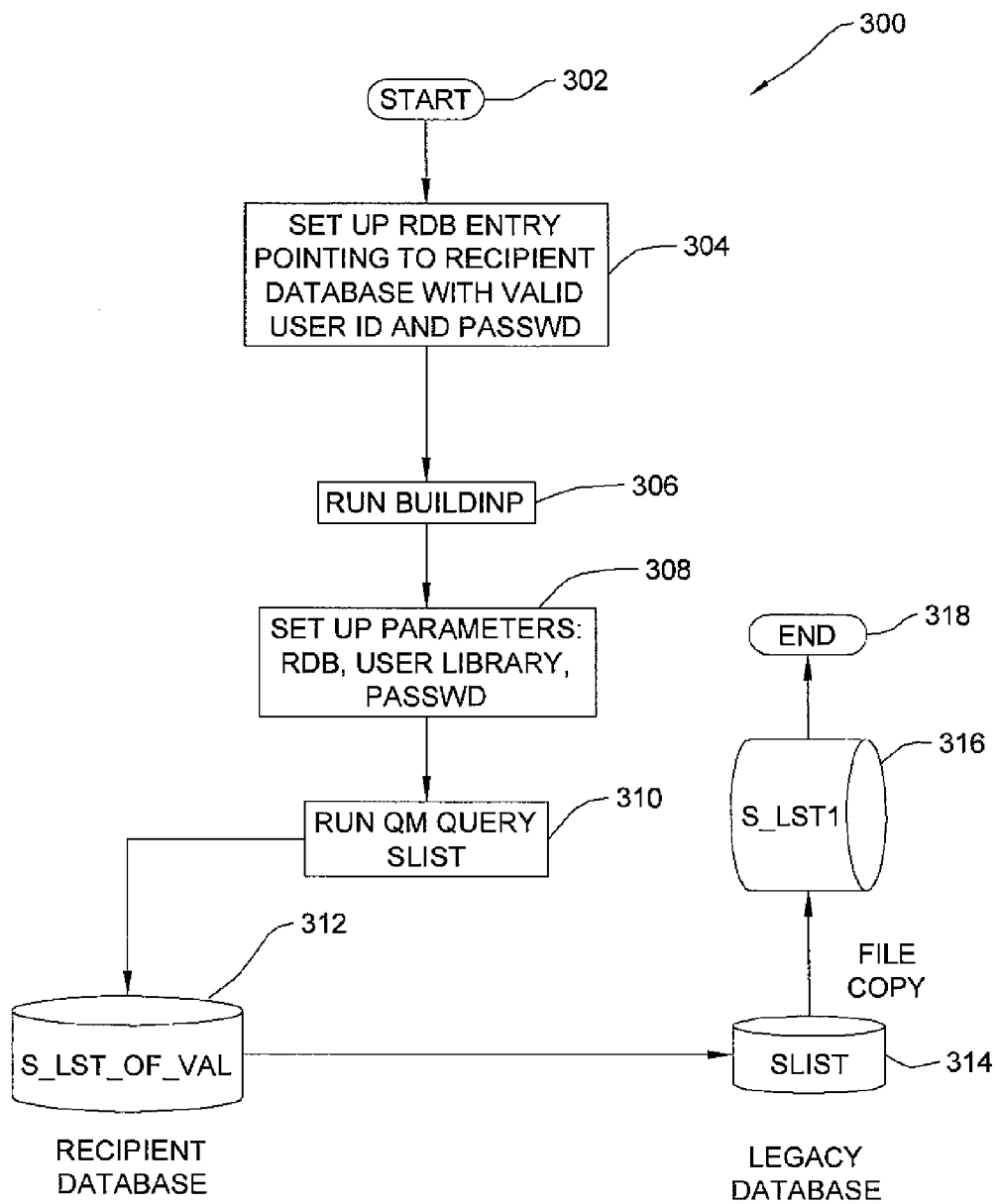
FIG. 2 is an illustration of a flowchart depicting a method for creating a legacy value table in the legacy database that corresponds to a recipient value table in the recipient database, in accordance with an embodiment of the invention.

Reference is now made to FIG. 2, which depicts a flowchart 300 outlining a method for creating a legacy value table in the legacy database that corresponds to a recipient value table in the recipient database. The method starts at step 302 with setting up the RDB entry pointing to the recipient database with a valid User Id and Passwd (password) in step 304. The program BUILDINP is run in 306. The BUILDINP program or code is used to connect remotely to the Siebel database and to insert data from the S_LST_OF_VAL table in the Siebel database into a table that is created in the legacy database. In particular, in order to run the BUILDINP program in step 308 of FIG. 2, one needs to set up the parameters RDB, User Library, and Passwd (password), so that the BUILDINP program can connect remotely to the Siebel database. In a preferred embodiment, the RDB command is a built-in command in the legacy database which allows the remote query to be run for remotely extracting data from the Siebel table S_LST_OF_VAL in the recipient database using the User Id and Passwd and to connect to and remotely access the data from the Siebel database. Preferably, the User Id and Passwd are created on the recipient database system and, preferably, can be set forth by a system administrator. The User Id and Passwd provide privileges to access the Siebel database and to extract the data from the S_LST_OF_VAL table in the Siebel database and to put the data in the S_LST1 table stored in the legacy database. Next, in step 310, the BUILDINP program runs a remote QM (Query Manager) query SLIST to extract data from the S_LST_OF_VAL table in the Siebel database in step 312 and to insert the extracted data into a flat file SLIST in the legacy database in step 314. The QM Query SLIST uses the BUILDINP program to connect remotely to the Siebel database to extract data from the S_LST_OF_VAL table and to insert in step 314 the data into a flat file SLIST in the legacy database, which drives the creation of the translation table, EIMXFER. Further, the data from the flat file SLIST is copied directly into a table S_LST1 in step 316, so that data can be retrieved from the S_LST1 table using the TYPE and NAME fields as a key. As such, the S_LST1 table contains all of the appropriate data extracted from the S_LST_OF_VAL table. Preferably, the data from the flat file SLIST gets copied to the S_LST1 table in the legacy database by using an AS/400 command, preferably, the Copy File (CPYF) command, which allows the copying of data from one file to another. The process ends at step 318 with the creation of the S_LST1 table.

Preferably, the S_LST_OF_VAL table is a Siebel table that resides on the AIX platform. The S_LST_OF_VAL table comes pre-populated, but any time additional values are required, a user preferably will update or add a set of data, as necessary, via tools offered by the Siebel application. Further, the step of extracting data from the S_LST_OF_VAL table in the Siebel database and creating the S_LST1 table in the legacy database using the BUILDINP code is done periodically to ensure the accuracy of any data translations, since the data contained in the S_LST1 table is used to build the translation table EIMXFER in the legacy database. When the Siebel application is first deployed, the table S_LST_OF_VAL preferably gets populated with data. This data S_LST_OF_VAL table is arranged so that there is a stored value (NAME) and a display value (VAL). The NAME is the raw data as it is stored in the Siebel database. The NAME is also how the data is typically stored in the legacy database. The VAL is how it is displayed in Siebel. When migrating data from a legacy database to a recipient database using the Siebel EIM application, the VAL is what is placed in the legacy interface table, not the NAME, but this is only the case where the legacy data field to be migrated corresponds to a recipient data field that is bound to the recipient value table, namely, the S_LST_OF_VAL table. Moreover, the NAME, in this case is used to determine what VAL should be used and placed in the legacy interface table. Accordingly, the S_LST_OF_VAL table provides two pieces of information, namely, the field name and the field value in the legacy system and the display value in the recipient database that is used by the BUILDINP program to build the S_LST1 table.

Figure 3:
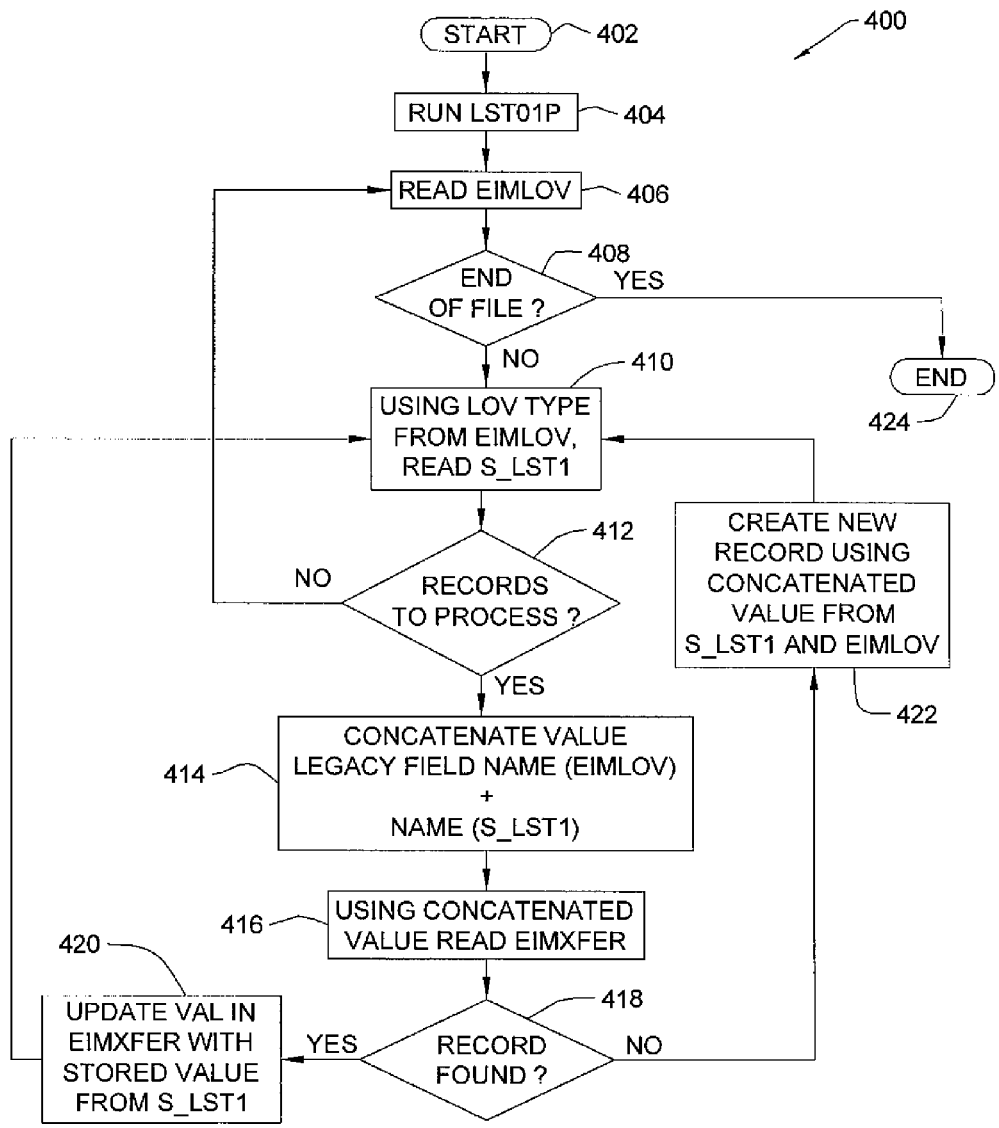
FIG. 3 is an illustration of a flowchart depicting a method for updating a translation table in the legacy database that defines one or more recipient data elements in the recipient database based upon the metadata of the legacy database, in accordance with an embodiment of the invention.

Turning to FIG. 3, numeral 400 illustrates a flowchart depicting a method for updating a translation table in the legacy database that translates metadata being migrated from the legacy database to values corresponding to a recipient value table in the recipient database. In a preferred embodiment, the method utilizes a program or code called LST01P, which is used to populate the EIMXFER translation table. Preferably, the EIMXFER table is already created in the legacy database, however, if necessary, the EIMXFER table can be created using the legacy system source Data Description Specifications (DDS) by a person skilled in the art. The method for populating the translation table EIMXFER starts at step 402 with the program LST01P being run in step 404. The LST01P program reads the EIMLOV table file in step 406. The LST01P program determines if it is the end of the EIMLOV file in step 408, that is, whether or not the EIMLOV table file has been completely read. If the LST01P program has not reached the end of the EIMLOV table file in step 408, the program LST01P uses the LOV TYPE in the EIMLOV file and reads the S_LST1 table file in step 410. However, if the LST01P program has reached the end of the EIMLOV table file in step 408, then the process ends at 424. On the other hand, after the completion of step 410, the LST01P program determines in step 412 if there are any records to process and, if yes, the LST01P program concatenates in step 414 the LEGACY FIELD NAME value from the EIMLOV table and the value stored in the NAME column in the S_LST1 table. However, if there are no records to process in step 412, the LST01P program loops back to step 406 and repeats steps 406-412. In particular, the LST01P program reads the EIMLOV table in step 406 and determines if it has reached the end of the EIMLOV table in step 408. If the LST01P program has reached the end of the EIMLOV file in step 408, the process of populating the EIMXFER table ends in step 424. If the LST01P program has not reached the end of the EIMLOV table file in step 408, the program LST01P uses the LOV TYPE in the EIMLOV file and reads the S_LST1 table file in step 410. Further, in step 412 if there are records to process, then the LST01P program concatenates in step 414 the LEGACY FIELD NAME value from the EIMLOV table and the value stored in the NAME column in the S_LST1 table and uses the concatenated value from step 414 to read the EIMXFER table in step 416. The LST01P program then determines whether the particular record has been found in the EIMXFER table in step 418. If yes, the LST01P program updates the VAL column in the EIMXFER table with the value stored in the VAL column of the S_LST1 table in step 420. However, if the record is not found in step 418, then the LST01P program creates a new record in step 422 using the concatenated value from the EIMLOV and S_LST1 tables as per step 414. After the EIMXFER table has been updated in step 420 or after a new record has been created in step 422, the LST01P program loops back to step 410 and using the LOV TYPE from the EIMLOV table, reads the S_LST1 table again. If there are records to process in step 412, the LST01P program concatenates in step 414 the LEGACY FIELD NAME value from the EIMLOV table and the value stored in the NAME column in the S_LST1 table. However, if there are no records to process in step 412, the LST01P program loops back to step 406 and reads the EIMLOV table. If the LST01P program has reached the end of the file in step 408, the process of populating the EIMXFER table ends in step 424. If not, the process of populating data in the EIMXFER table continues as outlined herein above.

In a preferred embodiment, the Siebel application is run on an AIX platform, which is a UNIX operating system, however, the Siebel application can run on many other platforms. Moreover, in one embodiment, the legacy application is run on an AS/400 computer or server, which uses the OS/400 operating system. As described herein above, the invention provides tables that can be customized to be able to translate legacy data into corresponding data that are stored in one or more Siebel EIM tables. However, one would have to create custom code to utilize the BUILDEIM code. In particular, although the BUILDEIM program automates the creation of an empty legacy interface table in the legacy system, it does not actually load the data into the legacy interface table. In particular, specific code would have to be written to populate the empty legacy interface table with data from the one or more legacy value tables. Since no two legacy systems are the same, preferably, a developer would need to create some custom code that actually uses the BUILDEIM program along with the LST01P translation code to update the legacy interface table with the specific data that will get transferred to the Siebel database. As such, the BUILDEIM program code can be used as a front end to any code that is used to migrate data into a Customer Relationship Management (CRM) application using the Siebel EIM (Enterprise Integration Manager) application. After the legacy interface table has been populated by a custom program, it is still located on the legacy system. Accordingly, the data in the legacy interface table still needs to be transferred to the recipient database. In a preferred embodiment, the data in the legacy database is accessed or extracted remotely from the Siebel CRM application using a DB2 Export command.

In yet another embodiment, the invention provides a computer program product for migrating data from a legacy database to a recipient database. The computer program product comprises a computer readable medium, first program instructions to build a legacy interface table in the legacy database using an updated control table provided in the legacy database, second program instructions to build a legacy value table in the legacy database corresponding to an updated recipient value table in the recipient database, third program instructions to update a translation table provided in the legacy database, the translation table being configured to translate legacy data elements in the legacy database to correspond to recipient data elements in the recipient database, fourth program instructions to populate the legacy interface table in the legacy database for migrating the data from the legacy interface table to the recipient database. Further, the computer program product comprises fifth program instructions to extract the data from the legacy interface table to the recipient database. Preferably, the first, second, third, fourth and fifth program instructions are stored on the medium. In a preferred embodiment, the third program instructions comprise instructions to update a combination table provided in the legacy database that maps the one or more legacy data fields in the legacy database to corresponding recipient data fields in the legacy value table, and to update the translation table by utilizing the legacy value table and the updated combination table. Further, preferably, the third program instructions comprise instructions to use as a key field in the combination table, a recipient data field that corresponds to a legacy data field to read in the legacy value table a stored field value that corresponds to a stored field value in a stored field name in the legacy data field, to create a concatenated value by concatenating the stored field name in the legacy data field in the combination table with the stored field value read in the legacy value table, and to utilize the concatenated value to update the translation table with a stored display value in the legacy value table. In a preferred embodiment, the recipient database is a Siebel database.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). Further, preferably, network medium can comprise of transmission devices on a network, such as, cables, routers, switches and/or network adapter cards.

Figure 4:
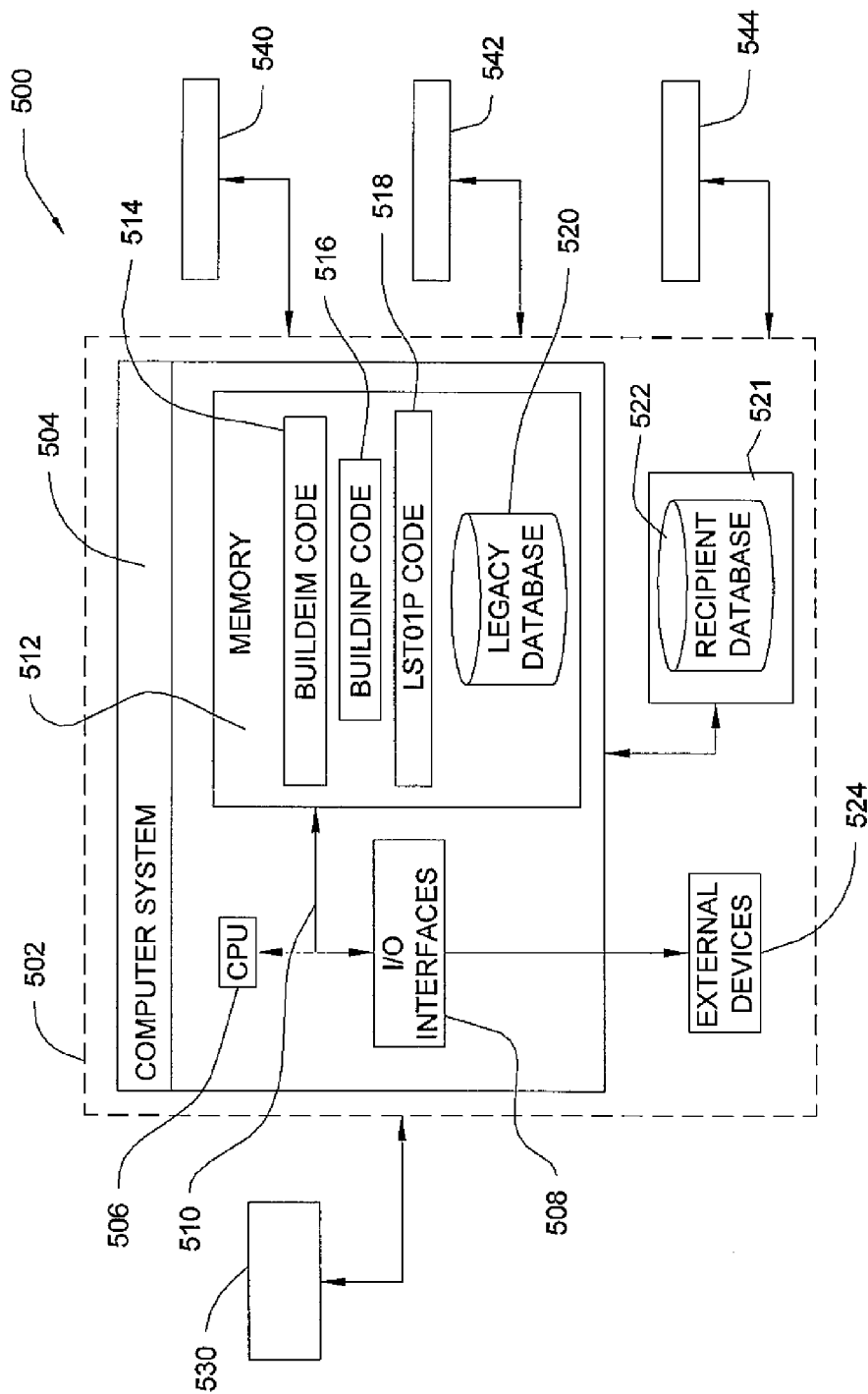
FIG. 4 is a schematic block system diagram illustrating a computer program product for migrating data from a legacy database to a recipient database, in accordance with an embodiment of the invention.

Referring to FIG. 4, reference numeral 500 is a schematic block system diagram illustrating a computer program product for migrating data from a legacy database to a recipient database. As depicted, system 500 includes a computer infrastructure 502, which is intended to represent any type of computer architecture that is maintained in a secure environment (i.e., for which access control is enforced). As shown, infrastructure 502 includes a computer system 504 that typically represents a server or the like. Preferably, the computer system 504 is a legacy computer or server, more preferably, an AS/400 computer or server, which uses the OS/400 operating system. It should be understood, however, that although not shown, other hardware and software components (e.g., additional computer systems, routers, firewalls, etc.) could be included in infrastructure 502.

In general, a user or programmer 530 interfaces with infrastructure 502 for migrating data from a legacy database to a recipient database. Similarly, one or more other users or programmers (designated by numerals 540, 542 and 544) can interface with infrastructure 502 to migrate data from a legacy database to a recipient database. Alternatively, a service provider 530 that provides a service (preferably, a service that is provided on a fee or subscription basis) to clients, for instance, 540, 542 and 544, for migrating data from a legacy database to a recipient database and can interface with infrastructure 502 to migrate data from a legacy database to a recipient database. To this extent, infrastructure 502 provides a secure environment. In general, the parties could access infrastructure 502 directly, or over a network via interfaces (e.g., web browsers) loaded on computerized devices (e.g., personal computers, laptops, handheld devices, etc. not shown in FIG. 4). In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

Computer system 504 is shown to include a CPU (hereinafter "processing unit 506"), a memory 512, a bus 510, and input/output (I/O) interfaces 508. Further, computer system 504 is shown in communication with external I/O devices/resources 524 and a server 521 that has a storage system 522. Preferably, the server 521 is a Siebel application server and preferably the storage system 522 includes the recipient database that is stored on the Siebel application server 521. In general, processing unit 506 executes computer program codes or scripts, such as the BUILDEIM code 514 and the BUILDINP code 516 and the LST01P code 518, which are stored preferably in memory 512 and alternatively can be stored in an external storage system (not shown in FIG. 4). Similarly, processing unit 506 executes the legacy database application 520. While executing a computer program code, processing unit 506 can read and/or write data, to/from memory 512, the recipient database 522, and/or I/O interfaces 508. Bus 510 provides a communication link between each of the components in computer system 504. External devices 524 can comprise any devices (e.g., keyboard, pointing device, display, etc.) that enable a user to interact with computer system 504 and/or any devices (e.g., network card, modem, etc.) that enable computer system 504 to communicate with one or more other computing devices.

Computer infrastructure 502 is only illustrative of various types of computer infrastructures for implementing the invention. For example, in one embodiment, computer infrastructure 502 comprises two or more computing devices (e.g., a server cluster) that communicate over a network to perform the various process steps of the invention. Moreover, computer system 504 is only representative of various possible computer systems that can include numerous combinations of hardware. To this extent, in other embodiments, computer system 504 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 506 may comprise a single processing unit, or be distributed across one or more processing units in one or more locations, e.g., on a client and server. Similarly, memory 512 on server 504 and/or the storage system 522 on server 521 can comprise any combination of various types of data storage and/or transmission media that reside at one or more physical locations. Further, I/O interfaces 508 can comprise any system for exchanging information with one or more external devices 524. Still further, it is understood that one or more additional components (e.g., system software, math co-processing unit, etc.—not shown in FIG. 4) can be included in computer system 504. However, if computer system 504 comprises a handheld device or the like, it is understood that one or more external devices 524 (e.g., a display) could be contained within computer system 504, not externally as shown. The storage system 522 on the server 521, which stores the recipient database, can be any type of database system capable of providing storage for information under the present invention. To this extent, the storage system 522 could include one or more storage devices, such as a magnetic disk drive or an optical disk drive. In another embodiment, the recipient database 522 includes data distributed across, for example, a local area network (LAN), wide area network (WAN) or a storage area network (SAN) (not shown). Although not shown, additional components, such as cache memory, communication systems, system software, etc., may be incorporated into computer system 504.

Reference is now made to FIG. 5, which depicts an example 600 of translating data to be migrated from a legacy database to a recipient database. In particular, the example pertains to a legacy data field (column) called country code (not shown in FIG. 5) that contains data which needs to be migrated to a recipient database. The legacy data field, LEGACY FIELD NAME (shown as a data field 636 in the EIMLOV table 630), has a stored field name of CACTRY (638), which has a stored field value of US (which is shown in 624 under the NAME data field 622 in the S_LST1 table 616). Further, the recipient database 660 has a recipient value table S_LST_OF_VAL table 602, which sets forth the format in which the legacy database data for country code needs to be translated into in order to migrate the country code data to the recipient database. In particular, the S_LST_OF_VAL table 602 has three columns or data fields, namely, a first data field, S_LST_OF_VAL.TYPE 604, a second data field, S_LST_OF_VAL.NAME 608 and a third data field, S_LST_OF_VAL.VAL 612. The S_LST_OF_VAL.TYPE data field 604 stores as a field type a description of the legacy data that is being migrated, namely, COUNTRY, as shown in 606, which corresponds to the field name CACTRY stored in the legacy database. Further, the S_LST_OF_VAL.NAME data field 608 stores a field value that corresponds to the field value stored in the legacy database, namely, US, shown in 610. Furthermore, the S_LST_OF_VAL.VAL data field 612 stores a display value that is the actual value stored in the recipient database, namely, UNITED STATES, shown in 614, which corresponds to the stored field value US in the legacy database. The value UNITED STATES is just one example of a value that is stored, preferably, there are many other values in the S_LST_OF_VAL.VAL data field that are stored in the recipient database. The data contained in the S_LST_OF_VAL table 602 gets copied to the S_LST1 table 616, shown in FIG. 5. In particular, the BUILDINP program (as shown in FIG. 2) runs a QM (Query Manager) query called SLIST, which is used to place the data from the Siebel S_LST_OF_VAL table first in a flat file SLIST in the legacy database (not shown in FIG. 5). The data from the flat file SLIST is then copied to the S_LST1 table 616 in the legacy database 670. The S_LST1 table 616 is keyed, so that data can be quickly retrieved from the S_LST1 table by the BUILDINP program when it reads the S_LST1 table using the LOV TYPE 618 and NAME 622 fields as a key. As shown in FIG. 5, the S_LST1 table 616 is identical to the S_LST_OF_VAL table 602 and contains three data fields that correspond to the three data fields in the S_LST_OF_VAL table, namely, a first data field, LOV TYPE 618 (corresponding to S_LST_OF_VAL.TYPE 604), a second data field, NAME 622 (corresponding to S_LST_OF_VAL.NAME 608) and a third data field, VAL 626 (corresponding to S_LST_OF_VAL.VAL 612). The LOV TYPE data field 618 stores a description of the legacy data that is being migrated but in the format used in the recipient database, namely, COUNTRY, as shown in 620. Again, COUNTRY is just one example of a LOV TYPE that is stored in the S_LST1 legacy value table, which is copied from the S_LST_OF_VAL recipient value table and, as such, preferably, there are many other possibilities that can be stored in these respective tables. Further, the NAME data field 622 stores a field value that corresponds to the field value stored in the legacy database, namely, US, shown in 624. Furthermore, the VAL data field 626 stores a display value that is the actual value stored in the recipient database, namely, UNITED STATES, as shown in 614 and 628, that corresponds to the field value US stored in the legacy database. Further, the LST01P program reads the EIMLOV table 630, which contains the data shown in FIG. 5. In particular, the EIMLOV table 630 contains the data field LOV TYPE 632, which corresponds to the column LOV TYPE 618 in the S_LST1 table 616, which although resides in the legacy database, contains data that is copied from the S_LST_OF_VAL table 602 in the recipient database and, as such, represents a recipient column. Further, the EIMLOV table 630 contains the LEGACY FIELD NAME column 636, which is an actual column in the legacy database and contains a value CACTRY 638 that corresponds to the field name CACTRY as stored in the legacy database. Accordingly, the LOV TYPE 632 data field in the EIMLOV table 630 has a stored value COUNTRY, shown in 634, corresponding to the value stored in 620 of the S_LST1 table 616; whereas, the data field LEGACY FIELD NAME 636 contains a value CACTRY, as shown in 638, corresponding to the stored field name in the legacy database. As explained with respect to FIG. 3, the LST01P program reads the stored value CACTRY in 638 in the legacy data field LEGACY FIELD NAME 636 in the EIMLOV table 630, and concatenates this value with the value stored in the NAME data field 622 of the S_LST1 table 616, namely, the value US stored in 624 to create a concatenated value CACTRYUS. The concatenated value CACTRYUS is looked up in the EIMXFER table 640, which contains the data fields LOV 642 (which contains the concatenated value) and VAL 646 (which contains the display value as stored in the recipient database), as shown in FIG. 5. As such, the LST01P program checks to see whether there is a record in the EIMXFER table 640 that has the concatenated value CACTRYUS, shown in 644. In particular, if the LST01P program finds the data field LOV 642 which contains the concatenated value CACTRYUS in 644, it updates the stored display value in the VAL data field 646 in the EIMXFER table 640 with the display value UNITED STATES, as shown in 648, which corresponds to both the display value 628 in the S_LST1 table 616 in the legacy database 670 and the display value 614 stored in the S_LST_OF_VAL table 602 in the recipient database 660. On the other hand, if the concatenated value is not found in the EIMXFER table 640, then the LST01P program creates a record with the data shown in 644 and 648 of FIG. 5. As shown in FIG. 5, the recipient database 660 and the legacy database 670 are part of a computer infrastructure 650 where, preferably, the recipient database 660 resides on one server and the legacy database resides on a separate server. Further, the recipient database 660 interfaces with the legacy database 670 as shown by the double-sided arrow 665. Similarly, each of the tables 616, 630 and 640 are part of the legacy database 670 and are referenced by one another as shown by the double-sided arrow 675 between the S_LST1 table and the EIMLOV table and by the double-sided arrow 680 between the EIMLOV table and the EIMXFER table. Although not shown in FIG. 5, first, an empty legacy interface table would have to be created in the legacy database using the BUILD-EIM code. The empty legacy interface table would have to be updated with the appropriate data fields from the EIMCTL table pertaining to the data to be migrated from the legacy database. Then after the data to be migrated has been translated using the EIMXFER table to match the stored data elements in the recipient database as outlined herein above with respect to FIG. 5, then the translated data from the EIMXFER table is populated into the legacy interface table, preferably, using a customized code for the data being migrated. After the legacy interface table has been populated with the translated data, then the data is remotely extracted from the recipient database using a query, preferably, a DB2 Export command.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for translating data to be migrated from an older legacy database to a newer recipient database, said method comprising:
translating, by a processor of a computer system, legacy data elements in the older legacy database to correspond to the one or more recipient data elements in the newer recipient database by utilizing a translation table in the older legacy database, wherein the translation table in the older legacy database had been previously updated, wherein the translation table defines the one or more recipient data elements in the newer recipient database based upon metadata of the older legacy database, wherein the metadata of the older legacy database describes one or more legacy data fields in the older legacy database, wherein the older legacy database utilizes a first operating system, wherein the newer recipient database utilizes a second operating system, wherein the second operating system differs from the first operating system, and wherein the legacy data elements translated in the older legacy database are used to migrate the legacy data elements translated from the older legacy database to the newer recipient database.

2. The method of claim 1, said method further comprising:
said processor populating a legacy interface table created in the older legacy database with the legacy data elements that are translated and any remaining legacy data elements that are not translated; and
said processor remotely extracting the legacy data elements that are translated and said any remaining legacy data elements that are not translated from the legacy interface table to one or more recipient intermediary tables in the newer recipient database, said one or more legacy data fields in the older legacy database being mapped to the one or more recipient intermediary tables in the newer recipient database.

3. The method of claim 1, wherein the older legacy database comprises a control table that has data descriptions for the one or more recipient intermediary tables in the newer recipient database, said one or more legacy data fields in the older legacy database being mapped to the one or more recipient intermediary tables in the newer recipient database, said method further comprising:
said processor updating the control table; and
said processor creating an empty legacy interface table in the older legacy database by utilizing the updated control table.

4. The method of claim 1, wherein the metadata of the older legacy database comprise a field name and a field value, wherein the legacy data elements in the older legacy database comprise the field value, and wherein the one or more recipient data elements in the newer recipient database comprise a display value.

5. The method of claim 1, said method further comprising:
said processor creating a legacy value table in the older legacy database that corresponds to a recipient value table in the newer recipient database, wherein said creating the legacy value table comprises (i) updating the recipient value table in the newer recipient database; and (ii) populating the legacy value table in the older legacy database by utilizing the updated recipient value table in the newer recipient database.

6. The method of claim 5, wherein the older legacy database comprises a combination table that maps the one or more legacy data fields in the older legacy database to corresponding recipient data fields in the legacy value table, and wherein the method further comprises:
prior to said translating legacy data elements in the older legacy database, said processor populating the translation table by utilizing the legacy value table and the combination table.

7. The method of claim 6, wherein said populating the translation table comprises:
using as a key field in the combination table, a recipient data field that corresponds to a legacy data field to read in the legacy value table a stored field value that corresponds to a stored field value in a stored field name in the legacy data field;
creating a concatenated value by concatenating the stored field name in the legacy data field in the combination table with the stored field value read in the legacy value table; and
utilizing the concatenated value to populate the translation table with a stored display value in the legacy value table.

8. The method of claim 1, wherein the newer recipient database has metadata describing one or more recipient data fields in the newer recipient database, and wherein the metadata of the older legacy database differs from the metadata of the newer recipient database.

9. The method of claim 1, said method further comprising:
said processor mapping the one or more legacy data fields in the older legacy database to one or more recipient intermediary tables in the newer recipient database.

10. The method of claim 1, said method further comprising:
providing at least one support service for at least one of creating, integrating, hosting, maintaining, and deploying computer-readable program code in the computer system, said program code being executed by the processor to implement said translating.

11. A computer program product, comprising a computer readable storage device having computer readable program code stored therein, said program code, which upon being executed by a processor of a computer system, implements a method for translating data to be migrated from an older legacy database to a newer recipient database, said method comprising:
said processor translating legacy data elements in the older legacy database to correspond to the one or more recipient data elements in the newer recipient database by utilizing a translation table in the older legacy database, wherein the translation table in the older legacy database had been previously updated, wherein the translation table defines the one or more recipient data elements in the newer recipient database based upon metadata of the older legacy database, wherein the metadata of the older legacy database describes one or more legacy data fields in the older legacy database, wherein the older legacy database utilizes a first operating system, wherein the newer recipient database utilizes a second operating system, wherein the second operating system differs from the first operating system, and wherein the legacy data elements translated in the older legacy database are used to migrate the legacy data elements translated from the older legacy database to the newer recipient database.

12. The computer program product of claim 11, said method further comprising:
said processor populating a legacy interface table created in the older legacy database with the legacy data elements that are translated and any remaining legacy data elements that are not translated; and
said processor remotely extracting the legacy data elements that are translated and said any remaining legacy data elements that are not translated from the legacy interface table to one or more recipient intermediary tables in the newer recipient database, said one or more legacy data fields in the older legacy database being mapped to the one or more recipient intermediary tables in the newer recipient database.

13. The computer program product of claim 11, wherein the older legacy database comprises a control table that has data descriptions for the one or more recipient intermediary tables in the newer recipient database, said one or more legacy data fields in the older legacy database being mapped to the one or more recipient intermediary tables in the newer recipient database, said method further comprising:
said processor updating the control table; and
said processor creating an empty legacy interface table in the older legacy database by utilizing the updated control table.

14. The computer program product of claim 11, wherein the metadata of the older legacy database comprise a field name and a field value, wherein the legacy data elements in the older legacy database comprise the field value, and wherein the one or more recipient data elements in the newer recipient database comprise a display value.

15. The computer program product of claim 11, said method further comprising:
said processor creating a legacy value table in the older legacy database that corresponds to a recipient value table in the newer recipient database, wherein said creating the legacy value table comprises (i) updating the recipient value table in the newer recipient database; and (ii) populating the legacy value table in the older legacy database by utilizing the updated recipient value table in the newer recipient database.

16. A computer system comprising a processor, a memory coupled to the processor, and a computer readable storage device coupled to the processor, said storage device containing program code which, upon being executed by the processor, implements a method for translating data to be migrated from an older legacy database to a newer recipient database, said method comprising:
said processor translating legacy data elements in the older legacy database to correspond to the one or more recipient data elements in the newer recipient database by utilizing a translation table in the older legacy database, wherein the translation table in the older legacy database had been previously updated, wherein the translation table defines the one or more recipient data elements in the newer recipient database based upon metadata of the older legacy database, wherein the metadata of the older legacy database describes one or more legacy data fields in the older legacy database, wherein the older legacy database utilizes a first operating system, wherein the newer recipient database utilizes a second operating system, wherein the second operating system differs from the first operating system, and wherein the legacy data elements translated in the older legacy database are used to migrate the legacy data elements translated from the older legacy database to the newer recipient database.

17. The computer system of claim 16, said method further comprising:
said processor populating a legacy interface table created in the older legacy database with the legacy data elements that are translated and any remaining legacy data elements that are not translated; and
said processor remotely extracting the legacy data elements that are translated and said any remaining legacy data elements that are not translated from the legacy interface table to one or more recipient intermediary tables in the newer recipient database, said one or more legacy data fields in the older legacy database being mapped to the one or more recipient intermediary tables in the newer recipient database.

18. The computer system of claim 16, wherein the older legacy database comprises a control table that has data descriptions for the one or more recipient intermediary tables in the newer recipient database, said one or more legacy data fields in the older legacy database being mapped to the one or more recipient intermediary tables in the newer recipient database, said method further comprising:
said processor updating the control table; and
said processor creating an empty legacy interface table in the older legacy database by utilizing the updated control table.

19. The computer system of claim 16, wherein the metadata of the older legacy database comprise a field name and a field value, wherein the legacy data elements in the older legacy database comprise the field value, and wherein the one or more recipient data elements in the newer recipient database comprise a display value.

20. The computer system of claim 16, said method further comprising:

said processor creating a legacy value table in the older legacy database that corresponds to a recipient value table in the newer recipient database, wherein said creating the legacy value table comprises (i) updating the recipient value table in the newer recipient database; and (ii) populating the legacy value table in the older legacy database by utilizing the updated recipient value table in the newer recipient database.

* * * * *